United States Patent [19]

Blatchford

[11] Patent Number: 4,479,916

[45] Date of Patent: Oct. 30, 1984

[54] METHOD OF MAKING A BUILDING PANEL

[75] Inventor: John M. A. Blatchford, "Linden Lea", Norton Hill, Midsomer Norton, Bath, Avon, England

[73] Assignee: John M. A. Blatchford, Bath, England

[21] Appl. No.: 348,318

[22] Filed: Feb. 12, 1982

[30] Foreign Application Priority Data

Feb. 13, 1981 [GB] United Kingdom ............... 8104617

[51] Int. Cl.³ .......................... B29D 3/00; B29H 9/00
[52] U.S. Cl. .................................... 264/263; 29/428; 29/460; 52/405; 264/233
[58] Field of Search ............... 29/455 L, 455 M, 428, 29/460; 52/405, 404, 569; 156/73.6; 264/233, 261, 263

[56] References Cited

U.S. PATENT DOCUMENTS

| | | | |
|---|---|---|---|
| 1,897,327 | 2/1933 | Olson | 52/569 |
| 2,047,109 | 7/1936 | Nagel | 52/405 |
| 2,273,775 | 2/1942 | Strong | 52/405 |
| 2,477,381 | 7/1949 | Lewis | 52/405 X |
| 3,984,957 | 10/1976 | Piazza | 52/405 X |
| 4,206,163 | 6/1980 | De Coster | 264/333 X |
| 4,394,201 | 7/1983 | Haeussler | 52/405 X |

FOREIGN PATENT DOCUMENTS

| | | | |
|---|---|---|---|
| 2210061 | 9/1972 | Fed. Rep. of Germany | 52/405 |
| 2141268 | 3/1973 | Fed. Rep. of Germany | 52/405 |
| 1336887 | 7/1963 | France | 52/405 |
| 7412425 | 9/1974 | Netherlands | 52/405 |
| 209153 | 11/1956 | Sweden | 52/405 |

Primary Examiner—Charlie T. Moon
Attorney, Agent, or Firm—Banner, Birch, McKie & Beckett

[57] ABSTRACT

A method of making a building panel comprises the steps of (i) casting a first or inner layer of reinforced concrete which has an obverse face and a smooth reverse face; casting a second or outer, ribbed layer of reinforced concrete which has an obverse face and a smooth reverse face; placing the first and second layers adjacent one another with the two obverse faces directed inwardly towards one another; and providing a layer of thermal insulation material between the two obverse faces. By this method a panel can be provided of which the faces are both smooth.

14 Claims, 16 Drawing Figures

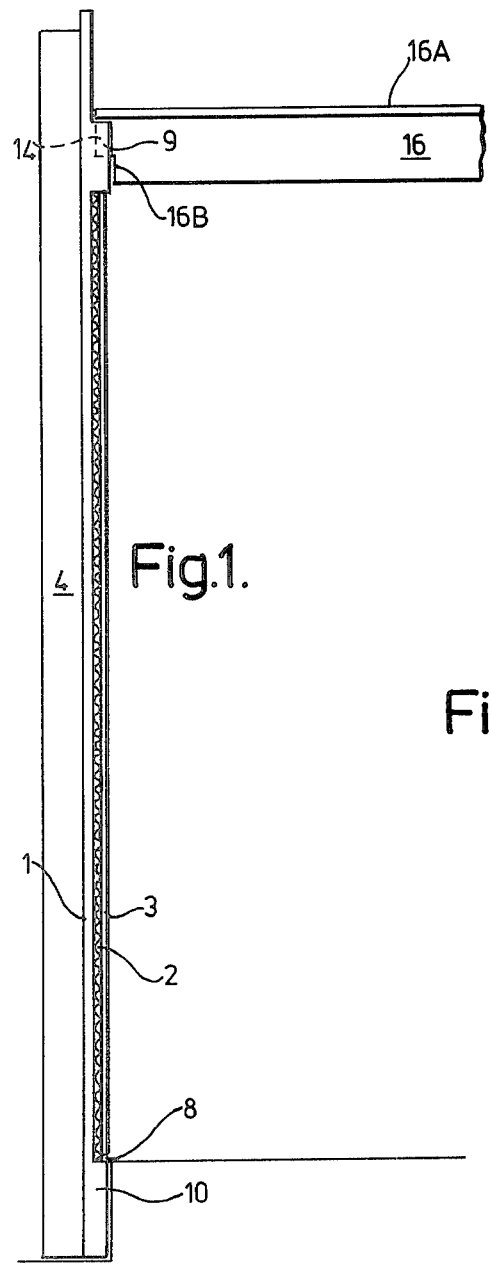
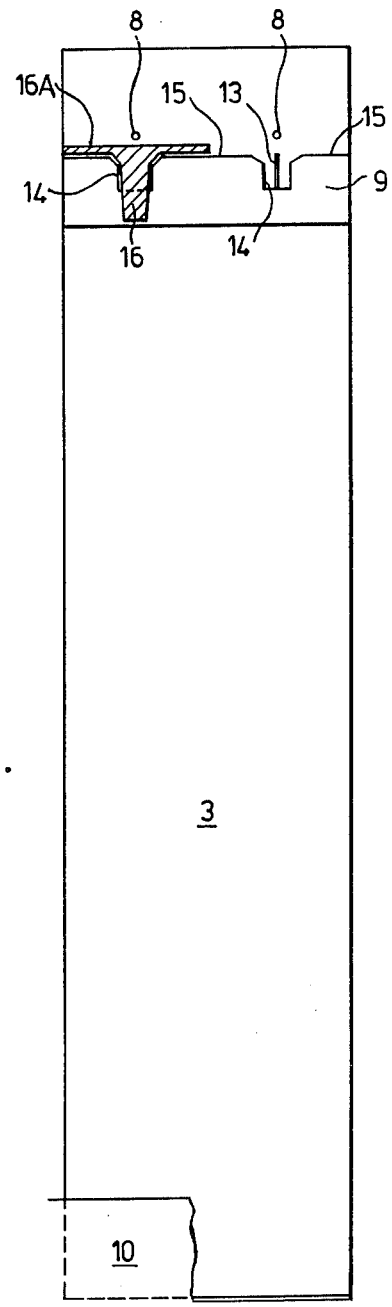

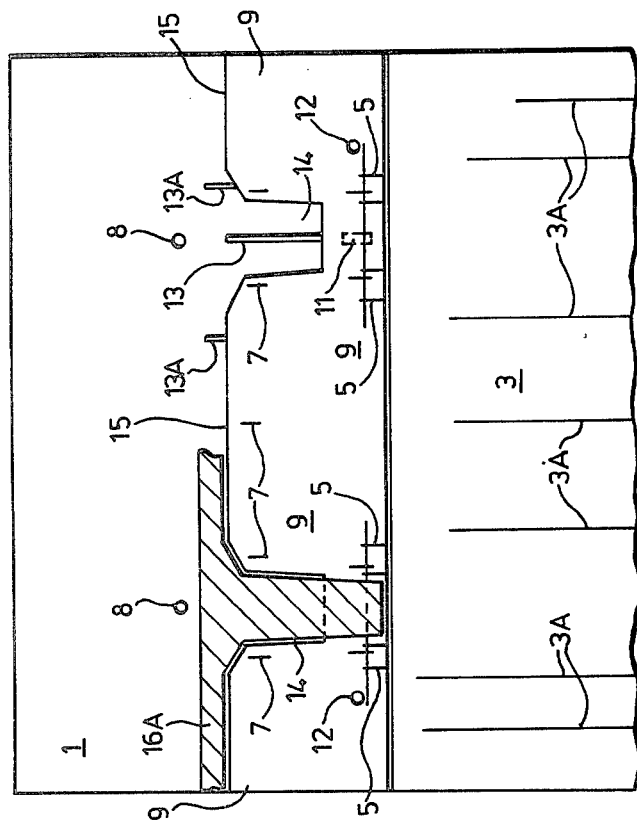
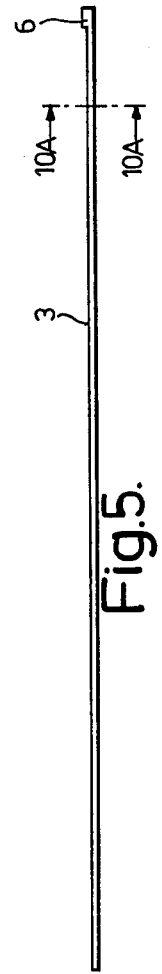
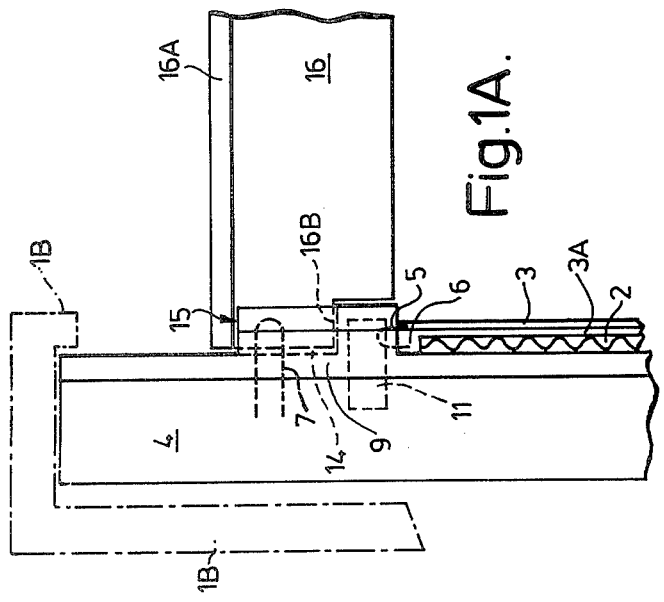
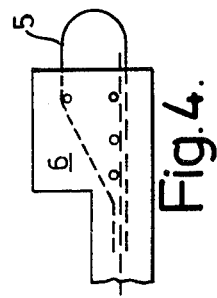

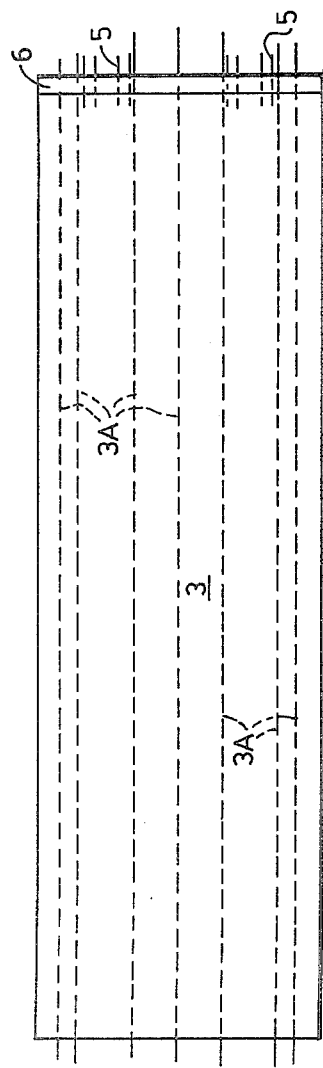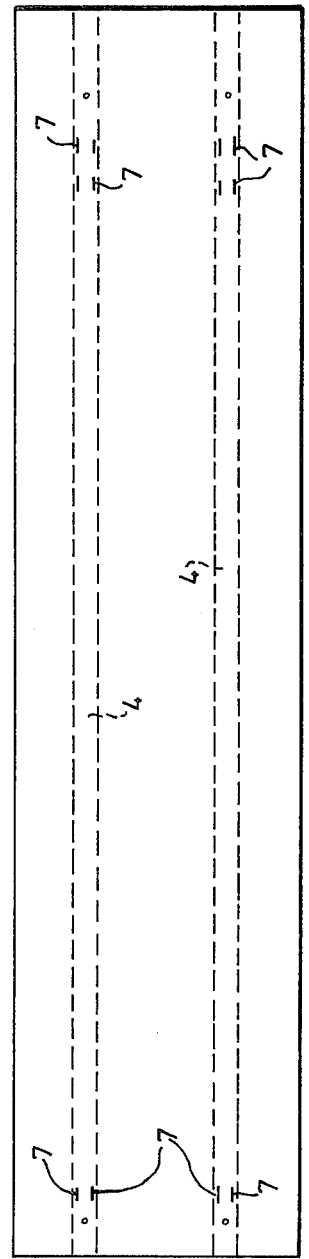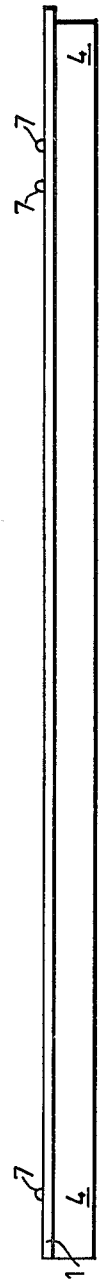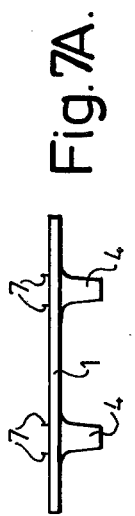
Fig.3.
Fig.6.
Fig.7.
Fig.7A.

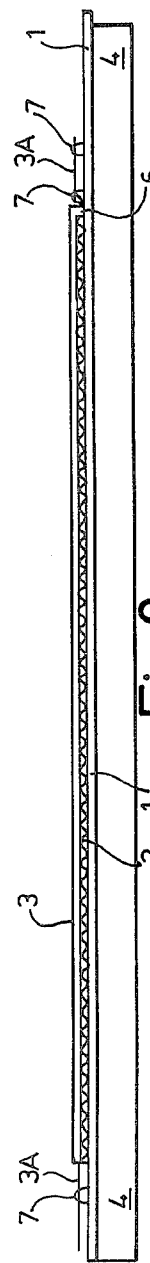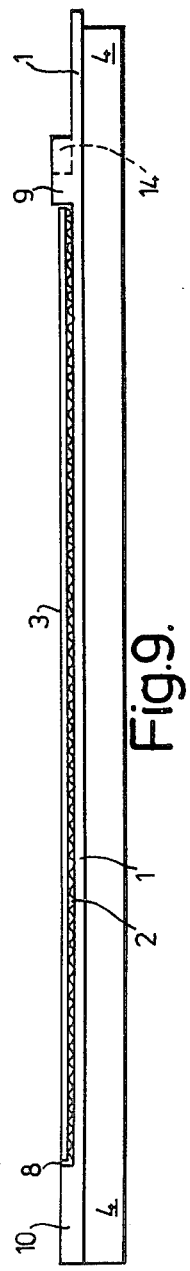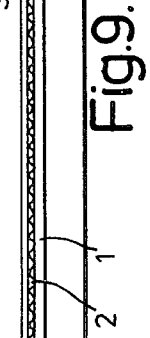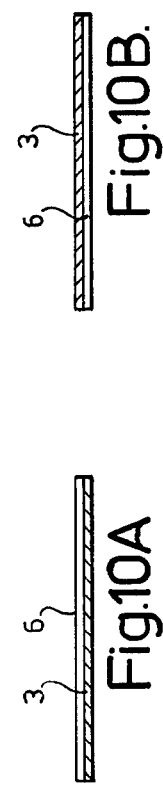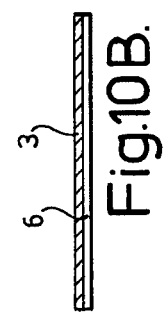

METHOD OF MAKING A BUILDING PANEL

FIELD OF THE INVENTION

This invention relates to a concrete building panel and to a method of manufacturing such a panel. Such panels are suitable for use as loading bearing well units or as wall cladding units.

DESCRIPTION OF PRIOR ART

In prior British Pat. No. 1,268,548 a building panel is disclosed which comprises first and second skins of prestressed/reinforced concrete with a layer of thermal insulation material sandwiched between them. Such a panel was made by moulding or casting one skin in a mould, placing a layer of the thermal insulation material on top of the first skin, and then casting or moulding the second skin on the insulation layer. Reinforcing rods or tendons were put in place as necessary. The disadvantage of this known method of manufacture was that one face of the completed panel was smooth, that is, the face which was cast in contact with the bottom of the mould, but the other face was rough, since it was not in contact with a mould surface when cast. A building panel is also known which is used as a load bearing wall unit. It has a ledge at an appropriate height on one face, to support the ends of roof panels. The disadvantage of this known building panel is that where the ends of the roof panels rest on the ledge, gaps and bare horizontal surfaces can be left, in which dust and dirt can accumulate. This is highly undesirable in some environments, for example when the wall and roof panels are used to make a building which is to be used for making or storing foods, for example. Also this known panel requires additional devices for holding the roof panels in place on the ledge and for providing a strong connection between the roof panels and wall panels.

SUMMARY OF THE INVENTION

Objects of this invention are to provide a method of manufacture of a building panel which largely avoids the above-mentioned disadvantages.

According to one aspect of this invention a method of making a building panel comprises the steps of:
 (i) forming a first layer of concrete so that it has an obverse face and a smooth reverse face;
 (ii) forming a second layer of concrete so that it has an obverse face and a smooth reverse face;
 (iii) placing a layer of thermal insulation material on the obverse face of the first concrete layer; and
 (iv) placing the second concrete layer on the layer of insulation material with the obverse face of the second concrete layer in contact with the layer of insulation material.

According to another aspect of this invention, a method of making building panel comprises the steps of:
 (i) providing a first layer of concrete having an obverse face and a smooth reverse face;
 (ii) providing a second layer of concrete having an obverse face and a smooth reverse face;
 (iii) placing the second concrete layer adjacent the first concrete layer with the two obverse faces directed towards each other; and
 (iv) providing a layer of thermal insulation material between the two obverse faces.

By using either of the above methods to make the building panel, both outer faces of the panel are smooth. The invention also includes a building panel whenever made by the above-described methods.

The building wall panel of the invention may have supporting means in the form of a ledge with a grooved recess or recesses. Thus the or each recess may in use receive the correspondingly shaped end part of a roof panel or floor unit. The supporting means is preferably in the form of a horizontally extending strip-like projection or corbel from a vertical face of the wall panel, this strip-like projection being in effect "castellated" to provide notch-like recesses or grooves with adjacent flat surfaces. In use the correspondingly shaped ends of the roof panel or floor unit slot into the notch-like recesses and provide a basis for a firm connection, as well as covering up virtually all dirt or dust collecting locations.

BRIEF DESCRIPTION OF THE DRAWINGS

The invention will now be described by way of example, with reference to the accompanying diagrammatic drawings, in which:

FIG. 1 is a side elevation showing a double-tee section wall panel and part of a roof unit;

FIG. 1A is an enlarged view of part of FIG. 1;

FIG. 2 is a rear elevation of the wall panel, showing the roof unit in section;

FIG. 2A is an enlarged view of part of FIG. 2;

FIG. 3 is a top plan of the first or inner concrete layer of the wall panel in a horizontal position;

FIG. 4 is an enlarged detail elevation of one end part of the first concrete layer;

FIG. 5 is a side elevation of the first concrete layer;

FIG. 6 is an underneath plan of the second or outer concrete layer of the wall panel in a horizontal position;

FIG. 7 is a side elevation of the second concrete layer;

FIG. 7A is an end view of FIG. 7;

FIG. 8 is similar to FIG. 7, but with a thermal insulation layer and the inner concrete layer in position;

FIG. 8A is an end view of FIG. 8;

FIG. 9 is similar to FIG. 7, but showing the completed wall panel in a horizontal position;

FIG. 9A is an end view of FIG. 9; this is the same as a top plan view of the wall panel of FIG. 1, with the roof unit omitted; and FIGS. 10A and 10B show stages in the manufacture of the first or inner concrete layer of the wall panel, FIG. 10A being a section on plane 10A—10A of FIG. 5.

DESCRIPTION OF THE PREFERRED EMBODIMENT

Referring to the drawings, a load-bearing wall panel has an outer or second concrete layer or skin 1, a thermal insulation board or layer 2, an inner or first concrete layer or skin 3, and two external ribs 4, the latter being integral with the outer skin and constituting a load-bearing double-tee in section, FIG. 7A. The outer skin could be of other cross-sectional shapes, for instance channel section or single tee section. Alternatively the outer skin could simply be a flat-slab. In other embodiments both skins could be ribbed.

A first mould is used to make the inner skin 3 which is cast with a smooth underside (FIG. 10A) by virtue of the smooth surface of the mould. Reinforcing steel strands 3A are incorporated in the usual manner, with their ends projecting, FIG. 3. These are prestressing strands. Some of the projecting ends are formed into loops 5, FIGS. 3 and 4, by which the inner skin is suspended. FIG. 1A. The inner skin is thus cast in the form of a thin slab, which in this embodiment has a rib 6. The slab is cast, cured, and demoulded; as seen in FIG. 10A its smooth surface is lowermost. The slab is then turned over, FIG. 10B, and stored, smooth side uppermost.

Next the double tee outer skin 1 is cast in a second mould with the normal reinforcement or prestressing tendons (not shown), FIGS. 6 and 7. Reinforcing bars or loops 7 are left projecting, see also FIG. 1A. Threaded sockets 8 are embedded at this stage, to provide for subsequent lifting and handling of the wall panels, FIG. 2A.

Thermal insulation material 2 in board form is now placed over most of the length of the outer skin, either before or after the outer skin has been cured. If however foam insulation is used, pieces of wood may be placed on the inner skin to provide a temporary support for the inner skin.

The cured inner skin 3 is now placed on the insulation material 2 with the reinforcing strand ends projecting, FIG. 8. Some of these are threaded through the loops 7. Alternatively they may be mechanically linked to them. At the lower end (left hand end, FIG. 8) the projecting strand ends are greased and provided with a plastics debonding sleeve. Suitable formwork or soft material is introduced to form an expansion gap 8. This expansion gap or joint allows the inner skin, in the finished panel (FIG. 9), to move relatively to the outer skin. The gap at the top of the inner skin is also preferably filled, for example with bitumen, to reduce heat flow upward by conduction into the corbel. As appears from FIGS. 1 and 1A, the inner skin in effect hangs by the loops 5 from a ledge portion or corbel 9 of the outer skin. This corbel 9 is cast on to the outer skin (FIG. 9), over the projecting reinforcement strands of the inner skin. The other (or lower) end of the outer skin is similarly cast with a thickened portion 10, where the weight of the structure is to be distributed to the foundations of the building.

Although in the present embodiment the inner skin is suspended by the loops 5 from the corbel 9 of the outer skin, it would be possible to fix the inner skin by other means, for example by bolting, or welding to metallic members cast in the corbel.

In the present embodiment the lower end of the inner skin 3 is connected by the strands 3A over which the thickened outer skin portion is cast. This dowel-like arrangement prevents the inner skin swinging inwards into the building and away from the outer skin. Other means could be used for this purpose, for instance T slots and sliding bolts.

This two stage moulding procedure provides a finished, insulated wall panel that has smooth outer and inner faces.

The corbel 9, as will be described, supports the roof units. If the latter are heavy, structural steel sections 11 (FIGS. 1A and 2A) may be incorporated in the corbel, to give improved bonding between the several layers of concrete and to provide improved shear resistance. Threaded sockets 12 are provided in the corbel as a temporary means for securing props during erection, FIG. 2A. Because these would have a medium load bearing capacity, they may be used later to support pipes and similar services within the building.

It is desirable, for safety, to have a dowel connection between concrete elements so as simply and positively to tie them together during erection. Such dowels may be as shown at 13 (FIG. 2A) where they would project up through a matching hole in the end of the roof slab or unit, or alternatively they may be located elsewhere across the width of the corbel to project through the fillet or the flange of the roof unit, see 13A in FIG. 2A.

Lifting attachments or sockets (not shown) are preferably, but not necessarily, located above the level of the corbel so that they are anchored within the ribs of the outer skin. After erection has been completed and the sockets are no longer required for lifting they may be used to secure facia elements (indicated by 1B in FIG. 1A) from inside the parapet, tie rods to hold the building together, or for other purposes.

As may be understood from FIGS. 1, 1A, 2, 2A and 9A, the corbel 9 is of what may be termed castellated formation. Thus the corbel 9 is a horizontally extending strip-like projection from the vertical inner face of the outer skin, as viewed in FIGS. 1 and 1A. It is castellated to provide notch-like recesses or grooves 14 with adjacent flat surfaces 15. A roof unit 16 has a top flange 16A and is shaped at its end to fit into a recess 14, FIGS. 1, 1A, 2 and 2A. In this way a strong connection is provided between the wall panel and the roof unit. Further, horizontal dust and dirt collecting surfaces within the building are reduced to a minimum, particularly since the flange 16A covers the surfaces 15.

The end of the roof unit is preferably notched at 16B (FIGS. 1 and 1A) where it fits the recess 14 of the corbel 9. Such notched formation 16B is optional, but can be beneficial for the following reasons:

It allows the insulation to extend for the maximum practical height. Any tying force from dowels is nearer the neutral axis of the roof and therefore less likely to cause cracking. The forming of dowel holes within the roof unit is easier and also the section is slightly wider at that point. Appearance is better. The weight of the corbel is reduced. The location of other bearing pads of for example neoprene is more easily maintained during construction and in service. Such bearing pads are also shielded to some extent from fire by the notched formation.

Where heat loss is to be reduced even further, insulation board may be fitted to the surface of the corbel between the legs of the roof unit. Neoprene bearing pads will also reduce conduction of heat from the roof unit to the relatively cold corbel.

The above-described method of the invention can provide the following advantages:

(i) A series of simple, well proven operations involving several moulds are used to create a sophisticated product.

(ii) The method can readily be adapted to make load bearing wall panels or matching end cladding wall panels, as required.

(iii) The method may use the same basic mould for producing the structural part of the panel as is used for making medium and long span floor slabs. Further, production can be switched from one to the other without the loss of a day's output because the structural part of the panel is simple in construction and generally similar to other constructions made in the same mould.

(iv) The moulding of the inner skin is also of multipurpose capability and can be changed quickly to the production of short span flooring which will complement the longer double-tees made in the outer mould. It can further produce flat sided slabs for secondary use in buildings, for example as partitions, or around lift shafts.

(v) The inner skin layers or slabs may be cast at any time in advance of the outer skins, provided the casting operation is completed before the slabs are needed.

(vi) The outer skin can also be cast and cured in advance of the inner skin being offered up to it. There is also the option of offering up the inner skin, and completing casting of the corbel, whilst the outer skin is still wet and in the mould.

(vii) Each mould operation is sufficiently simple to be carried out on a daily basis with steam curing. The use of steam curing will not damage the surface finish of the inner skin as would be possible if all the operations were to be carried out in a single mould.

(viii) The actual structural base of the outer skin, once made, could be used for roofing, or other forms of panel construction, in the event of a job cancellation or similar interruption.

(ix) The total work content on the rather expensive outer skin double-tee moulds is not too much for it to be turned around in a single working day using a long, efficient mould length.

(x) The thickness of the insulation material may be varied according to need using the same stock of basic inner and outer skins.

(xi) The insulation material may be in standard sheets or may be formed in, after completion of casting, according to which is most convenient at the time.

(xii) Lifting and stacking can be accomplished without virtually imparting additional forces on the somewhat vulnerable insulation material and inner skin.

The improved wall panel made in accordance with the invention can have the following advantageous features:

1. A single prefabricated element giving:
   a. Structural support to a roof and/or one or more floor levels as required.
   b. A wall area.
   c. Thermal insulation.
   d. Fire resistance.
   e. A smooth internal finish.
   f. Good external appearance.
   g. Ability to have facia options.
   h. Ability for safe and rapid erection.
2. Maintenance of good concrete cover to any steel fittings, because they can be accurately located using the prestressing tendons.
3. Good crack resistance and durability resulting from the compression due to the prestressing.
4. Ability to create some fixity where the base of the wall panel meets the supporting structure if matching steel fittings are cast into both.
5. The avoidance of ledges and pockets inside the building, promoting cleanliness.
6. A modular wall and roof construction.
7. A product with adequate strength for simple handling arrangements.
8. Ease and safety of site erection.
9. Minimum number of joints to seal and the simplicity of making effective seals even if there are small tolerance variations.
10. A panel in which the inner skin hangs in tension from a top corbel and is not supported, as is usual, at the bottom in which case it acts as a strut. This means:
    a. The weight of the inner skin itself tends to keep it straight and to prevent bowing.
    b. It can move up and down with temperature variations, provided there is an expansion gap at the bottom.
    c. No structural reliance need be placed on wall ties which are costly to install, conduct heat and are often subject to corrosion.
11. A wall panel having a base sufficiently thick to stiffen the thin flange against vertical cracking which is common in double tee panels, and to give large simple connections to the supporting structure with a simple damp course compression seal.
12. A system which is adaptable to make various kinds of panels, including cladding panels and thrust resisting panels, and which can be used in multi storey construction.

Although in the above-described embodiment the outer skin is the load-bearing structural skin, the arrangement could be reversed. Also, structural skin panels could be alternately inner and outer skin panels. Thus for example single-tee panels could be arranged alternately, with one tee rib projecting outwardly and the next inwardly, and so on.

I claim:

1. A method of making a building panel which panel comprises a first reinforced concrete layer having first and second ends; a second reinforced concrete layer having first and second ends; a layer of thermal insulating material between the first and second concrete layers; and prestressing strands extending within the first concrete layer, the method comprising the steps of:
   (a) casting the first concrete layer on a surface so as to embed the prestressing strands with ends projecting from the ends of the first concrete layer;
   (b) casting the second concrete layer on a surface in such manner as to be longer than the first concrete layer thereby providing two end portions of the second concrete layer;
   (c) placing a layer of thermal insulating material on the cast second concrete layer;
   (d) placing the first concrete layer over the layer of thermal insulating material with the projecting ends of the prestressing strands extending over the two end portions of the second concrete layer; and
   (e) casting concrete portions on the two end portions of the second concrete layer in such manner as to embed the projecting ends of the prestressing strands of the first concrete layer and to provide an expansion gap between at least one end of the first concrete layer and a respective said concrete portion of the second layer.

2. A method according to claim 1 wherein the second concrete layer is cast with at least two external longitudinally extending ribs.

3. A method of making a building panel which has two outer faces, the method being according to claim 1, wherein the concrete layers are cast on smooth surfaces whereby each outer face of the panel presents a smooth surface finish.

4. A method according to claim 1 including the step of forming some of the said projecting ends of the prestressing strands as loops.

5. A method according to claim 1 including the steps of (i) providing reinforcing means which project from the second concrete layer and (ii) threading projecting ends of the prestressing strands through the said reinforcing means before the said concrete portions are cast on the two end portions of the second concrete layer.

6. A method according to claim 5 wherein the said reinforcing means comprise bars.

7. A method according to claim 5 wherein the said reinforcing means comprise loops.

8. A method according to claim 1 including the steps of greasing the projecting ends of the prestressing strands at the second end of the first concrete layer and providing the projecting ends with a plastics debonding sleeve.

9. A method according to claim 1 including the steps of (i) providing an expansion gap between the other end of the first concrete layer and (ii) filling the expansion gap to reduce heat flow by conduction across the gap.

10. A method of making a wall panel which panel comprises a first upright reinforced concrete layer having upper and lower ends, a second upright reinforced concrete layer having upper and lower ends; a layer of thermal insulating material between the first and second concrete layers; prestressing strands extending within the first concrete layer; and reinforcing means in the second concrete layer; the method comprising the steps of:
   (a) casting the first concrete layer on a flat surface so as to embed the prestressing strands with ends projecting from the ends of the first concrete layer;
   (b) casting the second concrete layer on a flat surface in such manner as to be longer than the first concrete layer thereby providing upper and lower end portions and so that said reinforcing means projects from the said end portions;
   (c) placing a layer of thermal insulating material on the cast second concrete layer;
   (d) placing the first concrete layer over the layer of thermal insulating material with the projecting ends of the prestressing strands extending over the said end portions of the second concrete layer;
   (e) casting concrete portions on the said end portions of the second concrete layer in such manner as to embed the said projecting ends and the said projecting reinforcing means, and to provide a thermal expansion gap between (i) that end of the first concrete layer which in use of the panel will be the lower end and (ii) that end of said concrete portion of the second concrete layer which in use of the panel will be at the lower end of the second concrete layer.

11. A method according to claim 10 wherein the said concrete portion which is cast on the upper said end portion is in the form of a castellated ledge having notch-like grooves adapted to receive beams.

12. A method according to claim 11 wherein structural steel sections are incorporated in the concrete of the ledge below each groove.

13. A method according to claim 10 wherein one of the upright concrete layers is formed as an outer load-bearing structural layer.

14. A method according to claim 10 wherein one of the upright concrete layers is formed as an inner load-bearing structural layer.

* * * * *